United States Patent [19]

Schoubye

[11] Patent Number: 4,781,902

[45] Date of Patent: Nov. 1, 1988

[54] PROCESS FOR THE REMOVAL OF NITROGEN OXIDES AND SULPHUR OXIDES FROM FLUE GASES

[75] Inventor: Peter C. S. Schoubye, Horsholm, Denmark

[73] Assignee: Haldor Topsoe A/S, Denmark

[21] Appl. No.: 924,621

[22] Filed: Oct. 29, 1986

[51] Int. Cl.$^4$ .................. B01J 8/00; C01B 17/00; C01B 21/00; C01B 17/74

[52] U.S. Cl. .................... 423/239; 423/244; 423/533

[58] Field of Search .............. 423/235, 239, 244 A, 423/533, 244 R

[56] References Cited

U.S. PATENT DOCUMENTS 3,615,196  10/1971  Welty et al. ................. 423/244
3,914,390  10/1975  Kudo et al. ................. 423/244

FOREIGN PATENT DOCUMENTS 2726892  1/1979  Fed. Rep. of Germany ...... 423/239

OTHER PUBLICATIONS

P. Schoubye, "Ny rogrensnings proces fra Topsoe produceror slaglar svorlsyre, dansk Kem: 11, 1985.

*Primary Examiner*—Gregory A. Heller
*Attorney, Agent, or Firm*—Ostrolenk, Faber, Gerb & Soffen

[57] ABSTRACT

The invention relates to a process for eliminating nitrogen oxides and sulphur oxides from a stream of flue gas containing nitrogen oxides and sulphur oxides comprising the steps of (a) adding ammonia to the stream of flue gas and contacting the resulting stream, at a temperature of 250°–450° C., with a reduction catalyst for selective reduction of nitrogen oxides into nitrogen and water, the molar ratio of ammonia to nitrogen oxides being in the range of 0.6–1.8, (b) contacting the stream from step (a), at a temperature of 300°–470° C., with an oxidation catalyst for oxidation of unreacted ammonia into nitrogen and water and simultaneous oxidation of sulphur dioxide into sulphur trioxide, and (c) cooling the stream from step (b) for condensation of sulphur trioxide in the form of sulphuric acid.

The products of the process of the invention are steam, nitrogen, and concentrated sulphuric acid of commercial quality giving no waste disposal problems.

7 Claims, No Drawings

PROCESS FOR THE REMOVAL OF NITROGEN OXIDES AND SULPHUR OXIDES FROM FLUE GASES

FIELD OF THE INVENTION

The present invention relates to a process for elimination of nitrogen oxides and sulphur oxides from flue gases.

More specifically, it relates to a process for the elimination from flue gases of nitrogen oxides by selective catalytic reduction into nitrogen by ammonia and subsequent catalytic oxidation of unreacted ammonia into nitrogen and elimination of sulphur oxides by catalytic oxidation of sulphur dioxide into sulphur trioxide and cooling and condensation of the sulphur trioxide in the form of sulphuric acid.

Nitrogen oxides, in the form of NO2 and mainly NO, are formed by combustion of coal, oil, or gas in boilers especially in industrial plants or power stations or in internal combustion engines or in plants for the incineration of industrial or municipal waste especially with a high sulphur content. The resulting emission of nitrogen oxides to the atmosphere is an increasing problem as it may result in severe pollution such as photochemical smog.

Sulphur oxides are formed when burning fuel oil or coal or other fuel containing sulphur. The emission of sulphur oxides is also an increasing environmental problem.

DESCRIPTION OF THE PRIOR ART

Different methods have been suggested in order to reduce the amount of nitrogen oxides emitted into the atmosphere.

By modifying the combustion conditions, a certain decrease of the content of nitrogen oxides in the flue gases is possible. However, it is not possible by combustion and boiler modifications to reduce the content of nitrogen oxides further than to a level of about 300 ppm by combustion of coal. This level is still considered too high and, consequently, a number of methods for eliminating nitrogen oxides from flue gases have been suggested.

The elimination of nitrogen oxides from flue gases is usually carried out by catalytic reduction of the nitrogen oxides by use of ammonia as a reducing agent according to the reactions:

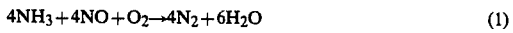
$$4NH_3 + 4NO + O_2 \rightarrow 4N_2 + 6H_2O \quad (1)$$

$$8NH_3 + 6NO_2 \rightarrow 7N_2 + 12H_2O \quad (2)$$

A large number of processes and catalysts have been suggested for this purpose.

In German Offenlegungsschrift No. 3,438,367 and in U.S. Pat. No. 4,113,660, such processes performed in the presence of certain metal oxide catalysts are described.

A general feature of the known processes is that they are carried out in a single step.

In order to obtain an efficient reduction of the content of the nitrogen oxides in a flue gas, the general experience is that it is necessary to add ammonia in excess of the stoichiometric amount according to reaction (1) or (2). However, this implies that a certain amount of the ammonia will not be reacted when passing the catalyst. The presence of ammonia in the treated flue gas may cause problems. When the treated gas also contains sulphur oxides (sulphur dioxide and/or sulphur trioxide), the ammonia may react with these sulphur oxides leading to formation of ammonium sulphite and/or sulphate. These ammonium compounds, and particularly ammonium sulphate which may be formed when both ammonia and sulphur trioxide are present in the gas, are highly undesirable since they may clog downstream equipment, e.g. heat exchangers for cooling the treated flue gas. Further, when free ammonia is present in the treated flue gas it will contaminate the desulphurization products with ammonium compounds and give rise to emission of ammonium compounds from the stack.

In order to reduce the content of ammonia in the treated flue gas to an acceptable level of e.g. 5-10 ppm, it will be necessary to reduce the amount of ammonia added and to employ increased volumes of catalyst. On the other hand, this will increase the catalyst costs and decrease the efficiency of the process as ammonia will then be present in less than stoichiometric amount and be the limiting factor, thus making an elimination of nitrogen oxides beyond 80-85% impossible.

A further drawback of the known processes, as employed for selective catalytic reduction of nitrogen oxides in the presence of ammonia in flue gases containing sulphur dioxide, is that the sulphur dioxide to some extent will be oxidized to sulphur trioxide. The sulphur trioxide will further increase the problems with formation of ammonium sulphate and it presents corrosion problems in the down-stream equipment, i.e. especially the above-mentioned heat exchangers.

Sulphur trioxide in the flue gas will not be quantitatively absorbed by a conventional desulphurization by scrubbing with calcium carbonate and may give rise to formation of sulphuric acid mist when the flue gas is cooled in the stack.

SUMMARY OF THE INVENTION

It has surprisingly been found that the above-mentioned problems of the state of the art processes for elimination of nitrogen oxides can be avoided in a simple and efficient way.

The present invention relates to a process for eliminating nitrogen oxides and sulphur oxides from a stream of flue gas containing nitrogen oxides and sulphur oxides comprising the steps of:

(a) adding ammonia to the stream of fluid gas and contacting the resulting stream, at a temperature of 250°-450° C., preferably 300°-420° C., with a reduction catalyst for selective reduction of nitrogen oxides into nitrogen and water, the molar ratio of ammonia to nitrogen oxides being in the range of 0.6-1.8, preferably 1.0-1.4, (b) contacting the stream from step (a) above, at a temperature of 300°-470° C., preferably 400°-440° C., with an oxidation catalyst for oxidation of unreacted ammonia into nitrogen and water and simultaneous oxidation of sulphur dioxide into sulphur trioxide, and (c) cooling the stream from step (b) for condensation of sulphur trioxide in the form of sulphuric acid.

DETAILED DESCRIPTION OF THE INVENTION

Investigations have shown that the present invention is suitably carried out by passing in step (a) of the process a flue gas stream containing nitrogen oxides and sulphur oxides through a catalyst bed containing a catalyst consisting essentially of 3 to 15% by weight vanadium pentoxide ($V_2O_5$) on a carrier consisting of titanium dioxide ($TiO_2$), silica ($SiO_2$), and/or alumina ($Al_2O_3$). The catalyst may be of any geometrical shape; however, a catalyst shape resulting in a large void and with parallel gas channels in the catalyst bed, such as a honeycomb catalyst, is preferred since the flue gas often contains considerable amounts of dust which otherwise might clog the catalyst bed. The flue gas may contain 1-20 vol. % $O_2$, 40 to 2000 vol.ppm nitrogen oxides, and 10 to 5000 vol.ppm $SO_2+SO_3$. The contents of sulphur oxides may be higher in flue gases in special cases, e.g. in roaster off-gases or when burning chemical waste.

It is anticipated that the stream of flue gas may be passed through a dust filter prior to the selective catalytic reduction of nitrogen oxides in step (a) in order to remove dust for avoiding problems with dust accumulation in the equipment and contamination of the sulphuric acid product.

Step (b) of the process according to the present invention is performed by passing the treated flue gas through a catalyst bed containing an oxidation catalyst which oxidizes ammonia to nitrogen and water according to reaction (3) and sulphur dioxide to sulphur trioxide according to reaction (4):

$$4NH_3 + 3O_2 \rightarrow 6H_2O + 2N_2 \tag{3}$$

$$2SO_2 + O_2 \rightleftharpoons 2SO_3 \tag{4}$$

This step (b) allows for adding more than the stoichiometric amount of ammonia in the above step a) thereby causing the reactions (1) and (2) to proceed further to the right enabling elimination of nitrogen oxides beyond 80-85%. Thus the reduction is facilitated and the necessary volume of catalyst for the reduction is decreased.

For the oxidation reactions (3) and (4), several types of oxidation catalysts may be used. A platinum catalyst is useful but has several drawbacks. Using a platinum catalyst will give rise to the risk that the oxidation of ammonia will proceed beyond nitrogen formation and provide nitrogen oxides. Furthermore, a platinum catalyst will also be sensitive to poisoning from halides or arsenic in the flue gas.

An oxidation catalyst based on transition metals, e.g. containing oxides of copper, chromium, manganese, and/or iron may be used for the oxidation of ammonia and conversion of sulphur dioxide.

A catalyst consisting essentially of 2 to 7% by weight vanadium promoted with at least one alkali metal in a vanadium to alkali metal atomic ratio in the range from 1:2 to 1:5 on a silica carrier is advantageously employed since this catalyst gives a high degree of conversion according to the reactions (3) and (4). The alkali metal employed is preferably potassium.

It has been found that the abovementioned catalyst is particularly suitable, as it is not sensitive to poisoning by halides and, at the same time, acts as an effective filter for retaining any remaining dust in the flue gas. All dust must be removed from the gas before step (c) of the process of the invention as dust would give fouling in the sulphuric acid condenser and/or contaminate the sulphuric acid.

After the oxidation in step (b), the sulphur trioxide formed in this step is eliminated in step (c), by cooling the stream for condensation of the sulphur trioxide in the form of sulfuric acid, before the treated flue gas is emitted to the atmosphere. The condensation may be performed by a conventional technique and a process in which sulphuric acid is condensed from a wet stream comprising sulphur trioxide is preferred as a flue gas normally comprises steam. The condensation may be performed as described e.g. in U.S. Pat. No. 4,348,373 or preferably as described in British Pat. No. 2,117,368.

The sulphuric acid obtained in the process of the present invention is a concentrated sulphuric acid of commercial quality. As the only products of the process of the invention are the sulphuric acid, nitrogen and water, no waste disposal problems occur.

The present invention will be further illustrated in the following examples describing a preferred embodiment of the invention and showing the advantages obtained in comparison with the known processes.

In the examples, all gas concentrations and ratios are given in mole fractions.

EXAMPLES 1-3

Conventional Elimination of Nitrogen Oxides

A stream of 100 $Nm^3$/h of flue gas from a coal fired power station boiler was taken out after the boiler's air preheater and the electrostatic filter. The stream of flue gas used in the below experiments contained 4 vol.% oxygen, 1000 vol.ppm sulphur dioxide, 500 vol.ppm nitrogen oxides, and 100 mg dust/$Nm^3$.

The flue gas was reheated to a temperature of 300°-450° C. by an electric heater upstream a catalytic converter in which the nitrogen oxides content was reduced by passing through a catalyst bed of 31.25 liters of catalyst for reduction of nitrogen oxides. The catalyst consisted of 6% by weight $V_2O_5$, 10% by weight $Al_2O_3$ and 84% by weight $TiO_2$ and with 70% void in gas channels having a hydraulic diameter of 7 mm. These blocks were e.g. prepared as described in Applied Catalysis 18 (1985) 335-352. The catalyst bed was divided in 5 blocks in series, each block having a volume of 6.25 liters of catalyst. Hence, the accumulated Normal Hourly Space Velocity (NHSV) after each block was 16000, 8000, 5333, 4000 and 3200 $Nm^3$/(h.$m^3$ catalyst), respectively. The ammonium was admixed to the flue gas upstream of the catalytic converter.

Measurements of nitrogen oxides, ammonia and sulphur trioxide after each of the blocks for various ammonia to nitrogen oxides ratios and converter inlet temperatures are given in table 1. It is seen that with an ammonia to nitrogen oxides ratio of 0.90, 84% elimination of nitrogen oxides was obtained after the 3rd block, but it is necessary to use 2 blocks more in order to eliminate the ammonia to a level below 5-10 vol.ppm. In order to obtain at least 97% elimination of nitrogen oxides (corresponding to 15 vol.ppm nitrogen oxides), it was necessary to increase the ammonia to nitrogen oxides ratio to 1.20, whereby, even after the 5th block, the ammonia-slip increased to 50-60 ppm ammonia, which would give serious problems with formation of ammonium sulphite and sulphate, the formation of the latter being enhanced due to the formation of sulphur trioxide in the catalyst. By increasing the catalyst temperature from 330° C. to 380° C. the ammonia slip decreased slightly, but the increase in sulphur trioxide formation would, however, offset the advantage of this decrease in ammonia slip.

TABLE 1

100 Nm³/h flue gas with 4% oxygen, 1000 ppm sulphur dioxide (SO₂), 10% water, 8 ppm sulphur trioxide (SO₃) and 500 ppm nitrogen oxides (NO$_x$) before 1st of 5 catalyst blocks of 6.25 liters each.
Ammonia (NH₃) is added before inlet of converter.

| | Inlet Converter | | After NO$_x$ reduction Catalyst NHSV, Nm³/(h · m³ catalyst) | | | | | | | | | | | | |
|---|---|---|---|---|---|---|---|---|---|---|---|---|---|---|---|
| | NH₃ | | 16000 | | | 8000 | | | 5333 | | | 4000 | | | 3200 | | |
| Ex. No. | NO$_x$ Ratio | Temp. °C. | NO$_x$ ppm | NH₃ ppm | SO₃ ppm | NO$_x$ ppm | NH₃ ppm | SO₃ ppm | NO$_x$ ppm | NH₃ ppm | SO₃ ppm | NO$_x$ ppm | NH₃ ppm | SO₃ ppm | NO$_x$ ppm | NH₃ ppm | SO₃ ppm |
| 1. | 0.90 | 330 | 180 | 130 | 10 | 110 | 60 | 12 | 80 | 20 | 14 | 65 | 10 | 16 | 55 | 5 | 18 |
| 2. | 1.20 | 330 | 160 | 260 | 10 | 60 | 150 | 12 | 20 | 100 | 14 | 8 | 75 | 16 | 4 | 60 | 18 |
| 3. | 1.20 | 380 | 150 | 230 | 15 | 50 | 110 | 20 | 20 | 80 | 25 | 10 | 60 | 30 | 5 | 50 | 35 |

EXAMPLES 4–7

Elimination of Nitrogen Oxides and Sulphur Oxides according to the Invention

In Examples 4–7, the advantages of the process according to the invention are demonstrated. The nitrogen oxides content of the flue gas was reduced in the same converter as used in Examples 1–3 using four blocks of each 6.25 litres of the same catalyst as in Example 1–3. A stream of 100 Nm³/n of the same flue gas as in Example 1–3 was used and inlet temperatures of 330° C. and 380° C. in the converter of step (a) of the invention were compared.

Measurements of nitrogen oxides, ammonia, and sulphur trioxide after two and four blocks of catalyst in step (a) corresponding to NHSV of 8000 Nm³/m³.h, and 4000 Nm³/M³.h, respectively, and after step (b) and step (c), respectively, for an ammonia to nitrogen oxides ratio of 1.20 and the above stated converter inlet temperatures are stated in Table 2. It is seen that in Examples 4 and 5 with an ammonia to nitrogen oxides ratio of 1.20, 88–90% elimination of nitrogen oxides was obtained in step (a) after two catalyst blocks, corresponding to NHSV=8000 h⁻¹ with about 180 ppm of ammonia slip which, however, is more than 99% oxidized mostly into nitrogen and H₂O at 420° C. in the subsequent oxidation reactor of step (b) with 40 liters of alkali promoted vanadium catalyst, which simultaneously oxidizes 95% of the sulphur dioxide into sulphur trioxide. 5–10% of the ammonia is reoxidized into nitrogen oxide which explains the small increase in nitrogen oxides content after passing the oxidation catalyst. The sulphur trioxide was then in step (c) hydrated into sulphuric acid and condensed in the form of concentrated sulphuric acid, so that the flue gas after the treatment according to the invention was essentially free from ammonia besides that nitrogen oxides were eliminated at an efficiency of 85% and sulphur dioxide by an efficiency of 95%.

In Examples 6 and 7 using 4 blocks of catalyst for eliminating nitrogen oxides in step a) of the process of the invention with an ammonia to nitrogen oxides ratio of 1.20, 97% nitrogen oxide elimination and 0.4 ppm ammonia slip was obtained after the oxidation in step (b) as compared to 87% nitrogen oxides removal and 10 ppm ammonia slip with an ammonia to nitrogen oxides ratio of 0.9 with 4 blocks and only one catalytic step according to the prior art, demanding a further step, if sulphur oxides also are to be eliminated.

These advantages of the process according to the invention are obtained on the expense of a somewhat higher NH₃-consumption, which, however, is of minor economic significance.

TABLE 2

100 Nm³/h flue gas with 4% oxygen, 1000 ppm sulphur dioxide (SO₂), 8 ppm sulphur trioxide (SO₃) and 500 ppm nitrogen oxides (NO$_x$) before 1st of two nitrogen oxides reduction catalyst blocks of 6.25 liters each, followed by catalytic oxidation at 420° C. and condensation of sulphuric acid (H₂SO₄).
Ammonia (NH₃) is added before inlet of converter.

| | Inlet of Converter | | After NO$_x$ reduction catalyst (step a) | | | | After oxidation catalyst (step b) | | | After H₂SO₄ condensation (step c) | | |
|---|---|---|---|---|---|---|---|---|---|---|---|---|
| Ex. No. | NH₃/NO$_x$ | Temp. °C. | NHSV (Nm³/h · m³) | NO$_x$ ppm | NH₃ ppm | SO₃ ppm | NO$_x$ ppm | NH₃ ppm | SO₃ ppm | NO$_x$ ppm | NH₃ ppm | SO₃ ppm |
| 4. | 1.20 | 330 | 8000 | 60 | 150 | 12 | 70 | 0.5 | 880 | 70 | 0 | 5 |
| 5. | 1.20 | 330 | 8000 | 50 | 110 | 20 | 58 | 0.5 | 880 | 58 | 0 | 5 |
| 6. | 1.20 | 330 | 4000 | 8 | 75 | 16 | 14 | 0.4 | 880 | 14 | 0 | 5 |
| 7. | 1.20 | 380 | 4000 | 10 | 60 | 30 | 15 | 0.4 | 880 | 15 | 0 | 5 |

What is claimed is:

1. A process for eliminating nitrogen oxides and sulphur oxides from a stream of flue gas containing nitrogen oxides and sulphur oxides comprising the steps of
   (a) adding ammonia to the stream of flue gas and contacting the resulting stream, at a temperature of 250°–450° C., with a reduction catalyst for selective reduction of nitrogen oxides into nitrogen and water, the molar ratio of ammonia to nitrogen oxides being in the range of 0.6–1.8,
   (b) contacting the stream from step (a), at a temperature of 300°–470° C., with an oxidation catalyst for oxidation of unreacted ammonia into nitrogen, nitrogen oxide and water and simultaneous oxidation of sulphur dioxide into sulphur trioxide, and
   (c) cooling the steam from step (b) to condense sulphur trioxide in the form of sulphuric acid
wherein the reduction catalyst employed in step (a) comprises 3–20% (w/w) of active catalyst, said active catalyst consisting of vanadium pentoxide, on a carrier of titanium dioxide, silica, alumina, or mixtures thereof, and the oxidation catalyst employed in step (b) comprises 2–7% (w/w) of vanadium and at least one alkali metal in an atomic ratio of alkali metal to vanadium in the range of 2–5.

2. A process as recited in claim 1, in which the molar ratio of ammonia to nitrogen oxides is in the range of 1.0–1.4.

3. A process as recited in claim 1, in which step (a) is carried out at a temperature in the range of 300°–420° C. and step (b) at a temperature in the range of 400°–440° C.

4. A process as recited in claim 1, in which the alkali metal of the oxidation catalyst employed in step (b) is potassium.

5. A process as recited in claim 1, in which the oxidation catalyst employed in step (b) is on a silica carrier.

6. A process as recited in claim 5, in which the oxidation catalyst employed in step (b) is on a silica carrier.

7. A process as recited in claim 6, in which step (a) is carried out at a temperature in the range of 300°–400° C. and a molar ratio of ammonia to nitrogen oxides in the range of 1.0–1.4, and in which step (b) is carried out at a temperature in the range of 400°–440° C.

* * * * *